Jan. 16, 1968  W. RÖSLER  3,364,094
APPARATUS FOR THE MANUFACTURE OF REINFORCED STRIPS
Filed Oct. 15, 1963  2 Sheets-Sheet 1
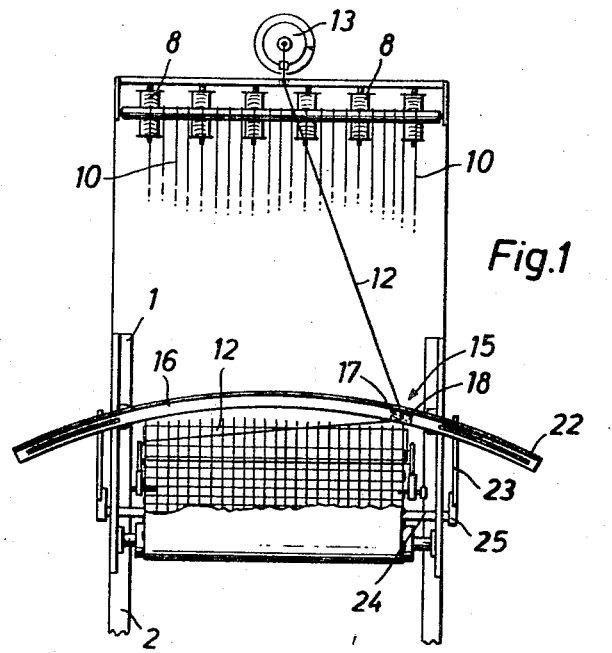
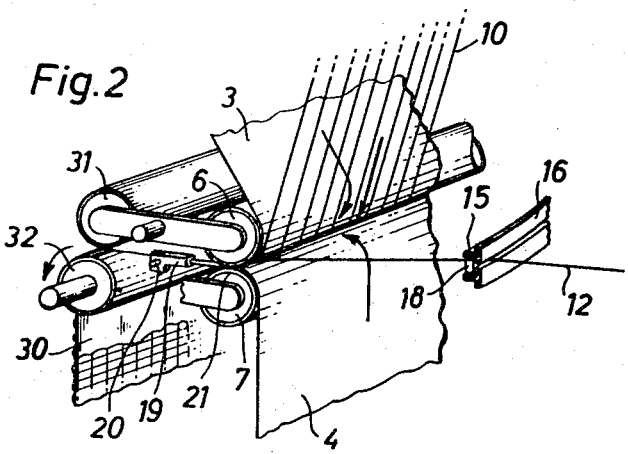
INVENTOR
Walter Rösler
BY Lowry & Rinehart
ATTYS.

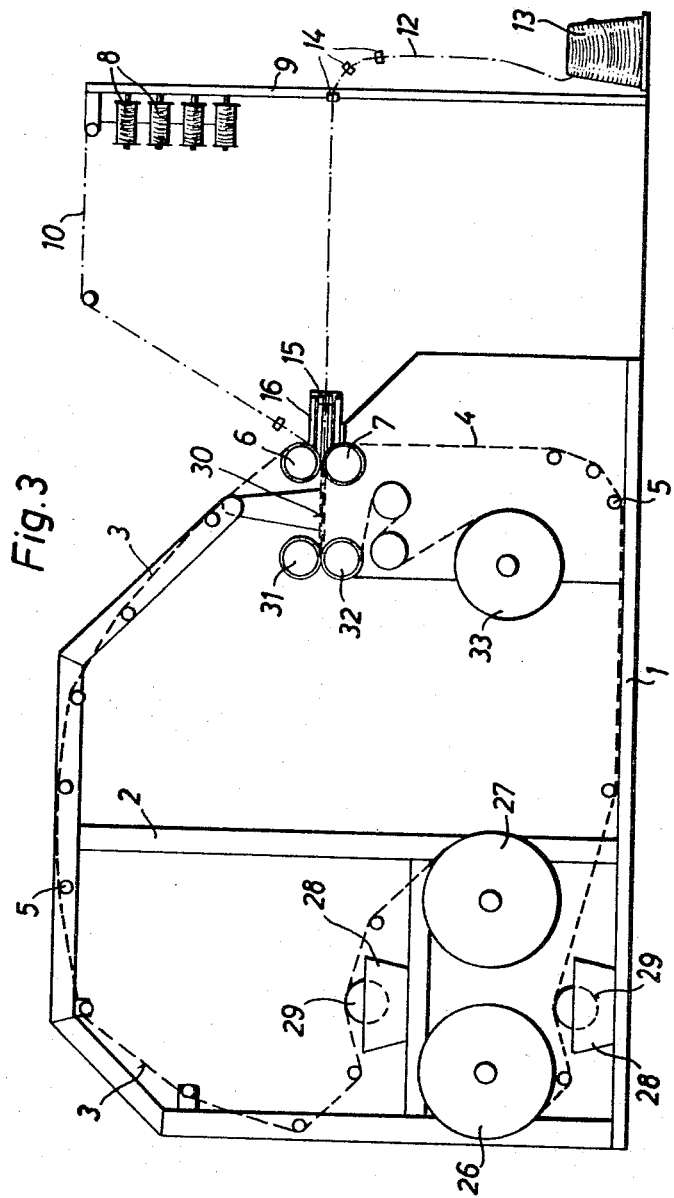

United States Patent Office 3,364,094
Patented Jan. 16, 1968

---

3,364,094
APPARATUS FOR THE MANUFACTURE OF REINFORCED STRIPS
Walter Rösler, Soest, Westphalia, Germany, assignor to Drahtwerke Rösler K.G., Soest, Westphalia, Germany
Filed Oct. 15, 1963, Ser. No. 316,323
Claims priority, application Germany, Oct. 18, 1962, D 40,091
2 Claims. (Cl. 156—440)

This invention relates to an apparatus for the production of a strip of suitable sheet material, such as textile fabric, synthetic plastic foil or, preferably, paper, which is strengthened by means of a reticular reinforcement.

Reinforced strips consisting of at least two sheets or webs bonded to one another by adhesives or the like and having a strengthening insert which is disposed between these strips and which is formed of longitudinally and transversely extending filaments, wires and the like, are known. In such arrangements, the longitudinal and transverse filaments of these reinforcing layers have a certain weave or union with one another. Welded lattices or gauzes, in which the longitudinal and transverse filaments are connected by welding at the points of intersection, are well known. For the manufacture of a strip reinforced with such gauzes, it is obvious that two independent manufacturing steps are necessary. The gauze is first of all separately manufactured and is then applied as an independent component between the strips of paper or the like which are provided with a layer of binding agent. The same applies if a fabric weave is provided for the longitudinal and transverse filaments instead of the welded union for holding the said filaments together. In a preceding step, a finished fabric is produced and, thereafter, this is introduced between the strips which are to be fastened together. It has, moreover, been proposed to use a gauze-like insert for strengthening the paper strips which are to be connected together, the transversely extending filaments of said insert consisting of individual, loose wire sections which are inserted with a predetermined spacing between the strips which are to be joined together. It is necessary in this case for the transverse filaments to be pretensed, so that they can be handled in suitable manner. The handling of individual filaments or the like for the manufacture of reinforced strips of paper or the like is complicated and time-wasting and considerably limits the capacity of the machine.

The invention has for its object an apparatus for the simplified production of a reinforced strip with a reticular strengthening insert which is formed of longitudinally and transversely extending filaments, the longitudinally extending filaments being introduced into the strips in the direction of feed of the said strips which are guided together between rollers, and an endless filament is used for forming the transverse filaments. The invention is characterized by the fact that the insertion of the transverse filaments from an endless filament is effected with continuous forward movement of the lining strips and, with the holding of the transversely extending filament by the pressing together of the lining strips, the following length of transverse filament is swung from one edge of the strip to the other edge into the gap formed by the strips. The speed of the swinging operation of the endless filament is matched to the advancing travel of the lining strip and to the width of the meshes. The transverse filaments assume a path extending perpendicular or substantially perpendicular to the longitudinal edge of the lining strips. By this arrangement, in which the production of the gauze-like insert itself and the lining operation with the strips embracing the gauze disposed between them are effected simultaneously at the position where the finished strip is formed, not only is it possible substantially to simplify the apparatus for the manufacture of the reinforced insert, but the simplification simultaneously leads to a considerable increase in output. Thus, the reinforced strip can be produced at a much more economical cost than with machines in which a sley or a welding and/or joining arrangement must additionally be present. Furthermore, many additional auxiliary means and auxiliary devices which would otherwise limit the working speed during the manufacturing process, become superfluous. The apparatus according to the invention permits a high working speed.

When laying the transverse filament, in order that the latter is able to be introduced in tensioned form directly into the gap between the paper strips to be joined, the transverse filament is preferably applied with a reciprocatory movement which extends arcuately before the bonding zone of the lining strips. For this purpose, a guide element for the transverse filament can be provided on a slide track facing the bonding zone of the strips and held in the open arc. The application of the transverse filament by a curved sley holds the reciprocating transverse filament tightly under tensile stress in a chord to the arcuate guideway. The transverse filament, on the completion of the reciprocatory movement, enters the bonding zone of the lining strips just being united substantially perpendicularly of the longitudinal axis of the said strips and, on entry, is fixed in position.

In many cases, especially when large mesh widths are desired in the gauze, it is expedient to arrange width-maintaining devices laterally of the strips at or near the point of contact of the rollers, the said means forming the reversal point for the endless transverse filament. For example, these width-retaining means are provided so that they can be lifted out of the loop formed in each case by the reciprocating filament.

The invention is hereinafter explained by reference to the drawings, in which:

FIG. 1 is a plan view of the apparatus for the manufacture of the reinforced strip according to the invention;

FIG. 2 is a perspective view of a detail of the apparatus of FIG. 1 to a larger scale; and FIG. 3 is a diagrammatic side elevational view of the complete machine according to the invention.

The apparatus for the manufacture of a laminated strip which may comprise paper and which is reinforced with a strengthening insert comprises a machine frame 2 which is mounted on a base plate 1. Two separate strips 3, 4, of sheet material such as paper or the like, are supplied over guide rollers 5 to the cylinders 6 and 7, which are rotatably mounted at a fixed position, the said strips 3 and 4 being brought into contact with one another and bonded together at the common cylinder gap. One of the cylinders 6 and 7 can be yieldably arranged for exerting a pressure against the other cylinder. The longitudinal filaments 10 of the reinforcing insert which is to be formed are drawn from spools 8, which are rotatably mounted on a support 9, and are supplied over guide rollers 11 to the gap between the cylinders 6 and 7. Furthermore, for forming the gauze-like reinforcing layer, an endless filament 12 serving at the transverse filament is supplied from a supply reel 13 over guide members 14 to the gap between the cylinders 6 and 7 in the manner hereinafter described. The strips 3 and 4 are provided on the surfaces which are to face one another with a layer of binding agent, e.g., bitumen or a similar water-resistant adhesive, so that the strips 3 and 4 are firmly bonded to one another on meeting in the gap between the cylinders 6 and 7.

The longitudinal strands or filaments 10 are applied at a predetermined spacing from one another into the gap between the cylinders 6 and 7 and the strips 3 and 4 and at the same speed as the strips. The filament 12 serving to form the transverse filaments in the reticular insert is of indefinite length and is supplied by a guide member 15 which can be reciprocated on a slide track 16 extending in an arc adjacent the gap between the cylinders 6 and 7. The filament 12 travels between two upstanding rollers 17, 18 mounted on the guide element 15, so that the transverse filament 12 is compelled to follow the guide element 15 with each reciprocatory movement of the latter. Width-retaining means 19 can be arranged laterally of the cylinders 6 and 7, the same means being mounted to pivot about a pin 20. The said means 19 comprises at the forward end a bent-over arm or finger 21, which is situated at the level of the gap between the cylinders 6 and 7. The guide element 15 is moved along the arcuate slide track 16 from one end to the other by means of a beater device, the said device consisting in known manner of an upper beater 22 and a lower beater 23 which is coupled therewith and which is driven from the shaft 24 by means of a crank 25. The arcuate slide track 16 always extends sufficiently far outwardly that the guide element 15 can at least reach the entire of the gap between the cylinders 6 and 7. The width-retaining means 19 is swivelled by means of a linkage which is actuated in dependence on the laid transverse filament 12.

The reinforcing gauze to be laid between the lining strips 3 and 4 is so developed that the longitudinal filaments and the associated transverse filament intersect one another in two planes unilaterally of one another. In the construction shown by way of example, the transverse filament 12 is fed beneath the longitudinal filaments 10 into the gap between the cylinders 6 and 7. The transverse filament 12 is laid around the arm or finger 21 of the width-retaining member 19 on one side of the cylinders 6 and 7. The guide member 15 is then moved on the curved sley 16 towards the other side of the cylinder, the transverse filament being maintained constantly under tension. As soon as the guide member 15 has reached the reversal point on the curved sley 16, the transverse filament forms a chord to the arc of the sley 16 from the finger of the width-retaining member on the other side, the said chord being situated in the gap between the cylinders 6 and 7. Since the transport of the lining strips 3 and 4 continues, the transverse filament lying in this chord is embedded in the layer of binding agent which is between the lining strips 3 and 4 coming at the same instant into mutual contact. It is thus secured in the final strip. At the same instant, the finger of the width-retaining member 19, which is situated on the same side as the guide element 15 swings in front of the transverse filament disposed in the cylinder gap, while the finger of the width-retaining member on the other side of the cylinders is lifted out of the filament loop which has formed. Simultaneously, the guide member is projected to the other side by the upper beater 22 along the arcuate slide track 16. In this way, the formation of the net or gauze forming the strengthening insert with immovable positioning of the transverse filament relatively to the longitudinal strands and the formation of the finally reinforced strips proceed simultaneously. The transverse filament is now secured by the adhesion of the strips.

The apparatus can be so designed that the separate strips 3 and 4 can be drawn off the supply reels 26 and 27. These separate strips 3 and 4 are provided on the facing sides with a layer of binding agent, e.g., bitumen or another adhesive. Serving for this purpose are the tanks 28 which accommodate the binder, the cylinders 29 dipping into said tanks and thus coating the surfaces of the strips 3 and 4 with binding agent in known manner. After having traveled through the cylinders 6 and 7, the lining strips 3 and 4, with interposition of the reinforcing insert formed into a gauze, are again brought together to form a complete strip 30. This strip is preferably guided through another pair of pressure rolls 31, 32 and reeled at 33.

If desired, two separate strips may be drawn from separate supply reels and fed to the gap between the cylinders 6 and 7 with one or both strips already having an adhesive layer on the corresponding side, which layer is, for example, water-soluble. As the strips travel through the pressure cylinders 6 and 7, the sticking of the strips is then effected automatically with simultaneous positioning of the longitudinal and transverse filaments of the reinforcing gauze which is formed in the cylinder gap.

What is claimed is:

1. Apparatus for manufacturing reinforced strips of sheet material, said apparatus comprising a pair of pressure rolls placed adjacent each other for exerting pressure upon items passed between said rolls, means for guiding a first strip of sheet material to the space between said rolls, means for guiding a second strip of sheet material to the space between said rolls, means for guiding a plurality of parallel reinforcing strands which are substantially equally spaced to the space between the first and second strips as they pass between the rolls, means for driving said rolls to feed the strips and the strands therethrough, and means for applying an endless filament transversely to said strips and said strands as they pass through said rolls to form a netlike reinforcing layer, said applying means comprising an arcuate guide means including movable means to impart to said endless filament an arcuately turned laying movement with an amplitude adapted to the width of the said strips.

2. Apparatus for manufacturing reinforced strips of sheet material, said apparatus comprising a pair of pressure rolls placed adjacent each other for exerting pressure upon items passed between said rolls, means for guiding a first strip of sheet material to the space between said rolls, means for guiding a second strip of sheet material to the space between said rolls, means for guiding a plurality of parallel reinforcing strands which are substantially equally spaced to the space between the first and second strips as they pass between the rolls, means for driving said rolls to feed the strips and the strands therethrough, and means for applying an endless filament transversely to said strips and said strands as they pass through said rolls to form a netlike reinforcing layer, said last named means comprising an arcuate guide member immediately adjacent the space between said rolls and extending the entire width of said rolls, means movably mounted on said arcuate guide means for determining the application of an endless filament to the junction of said two strips, and means for reciprocably moving said movable means across said arcuate guide means.

References Cited

UNITED STATES PATENTS

| | | | |
|---|---|---|---|
| 1,368,588 | 2/1921 | Wandel | 156—439 |
| 2,962,080 | 11/1960 | Hirsch | 156—440 |

FOREIGN PATENTS 1,170,468  9/1958  France.

ROBERT F. BURNETT, *Primary Examiner.*

MORRIS SUSSMAN, ALEXANDER WYMAN,
*Examiners.*

R. H. CRISS, *Assistant Examiner.*